Aug. 3, 1937.  S. F. DAVENPORT  2,088,775
FISH LURE
Filed Oct. 9, 1935
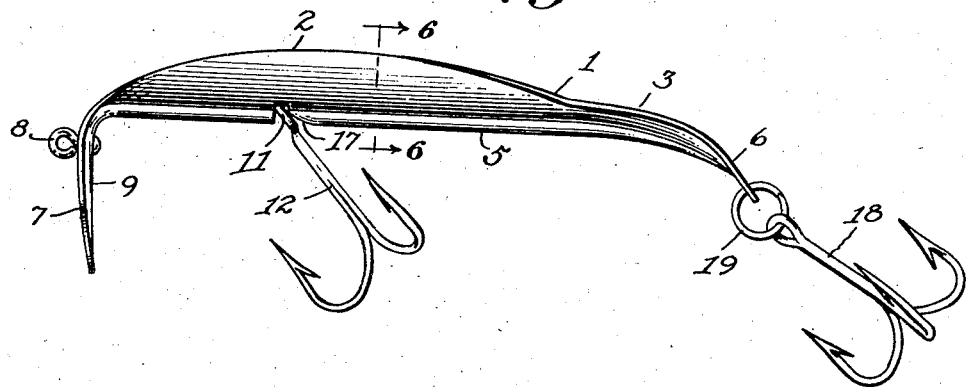
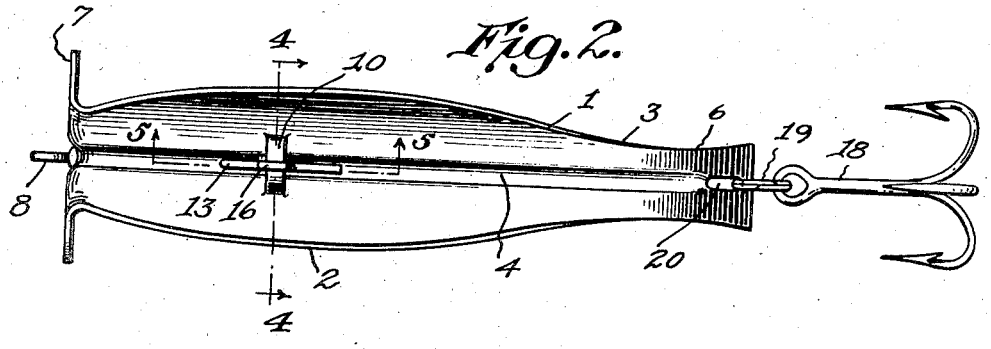
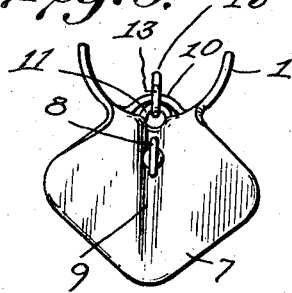
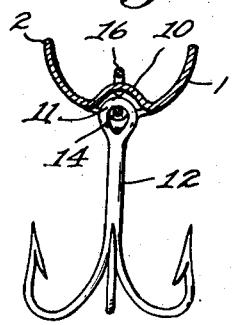
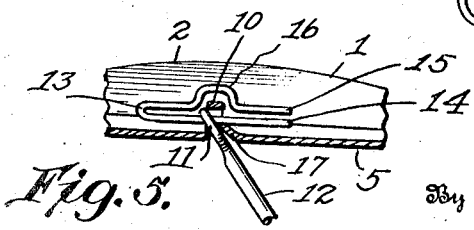
Inventor
S. F. Davenport
By Eccleston & Eccleston
Attorneys Patented Aug. 3, 1937

2,088,775

UNITED STATES PATENT OFFICE 2,088,775

FISH LURE

Sam F. Davenport, Garrett, Ind., assignor to Creek Chub Bait Company

Application October 9, 1935, Serial No. 44,292

12 Claims. (Cl. 43—42)

This invention relates to artificial lures or baits for fish, and has for its primary object to provide a lure of the decorated sheet-metal type which will be highly effective in simulating the actions of a minnow.

More specifically it is an object of the invention to produce a lure which will be caused to wiggle horizontally as it is drawn through the water, the amplitude of the lateral movements of the lure being limited by the shape of the lure so as to give a life-like imitation of the ordinary minnow.

A further object of the invention resides in so shaping the rear end of the lure that it will act as a horizontal rudder in maintaining the lure at the proper depth in the water.

Another object of the invention consists in a novel means for securing the forward gang hook to the lure body in a manner which not only permits an easy changing of hooks but also will prevent the hook from coming into contact with the body and at the same time presenting it in a most advantageous position for the strike of the fish.

A further object of the invention consists in the production of a lure which is strong and durable in construction and operation.

Other objects and advantages of the invention will be in part pointed out and in part apparent from the following description when taken in connection with the accompanying drawing, in which, Figure 1 is a side elevational view of the complete lure.

Figure 2 is a plan view thereof.

Figure 3 is a front elevational view, and

Figures 4, 5, and 6 are sectional views taken on lines 4—4, 5—5, and 6—6, and showing certain details of construction.

In the production of fish lures it is highly desirable that the lure simulate the action of minnows or the like so as to attract the larger fish, that it present the hooks in a position most likely to be struck by the fish, that it be well balanced so as to travel in a more or less regular manner through the water, and that it be of strong and sturdy construction and yet capable of quantity production at a moderate cost. These and other attractive features are all inherent in the artificial bait which will now be described in detail.

The lure body is indicated by the numeral 1 and is composed of a single piece of sheet metal of suitable gauge. The strip of metal is preferably bent transversely to provide side walls 2 which taper toward the rear end as indicated by numeral 3.

Pressed into the lure 1 is a groove 4 which extends longitudinally of the body and provides an external rib 5 which acts in the nature of a keel for the lure. This rib or keel 5 merges into a flat rear end portion 6 which is bent downwardly as indicated in Figure 1 and serves as a guide or rudder as will later appear.

The metal stamping from which the lure body is formed is provided at its forward end with an enlargement such as the section 7 which is bent downwardly at substantially a right angle to the body of the lure. This section forms a support for the line attaching eye 8 which is positioned below the lure body, and it will be noted that the rib 5, which serves the dual function of a keel and reinforcement for the body, also extends into the head section 7 as indicated by numeral 9. It will be apparent therefore that the downturned end 7 is suitably reinforced so as to retain its right-angular relation to the main body of the lure.

At a point intermediate the ends of the body 1 the lure is provided with a pair of transverse slits producing a bar 10 which is pressed upwardly as indicated in Figures 3 and 4. The bar 10 forms a stop or bearing for the eye 11 of the forward hook 12 and thus limits the inward movement of the hook with respect to the lure. This hook is releasably attached to the lure by a cotter key 13 provided with parallel legs 14 and 15 the latter being formed with a hump 16 for receiving the bar 10. As will appear from an inspection of Figure 5 the leg 14 passes under the bar 10 and through the eye 11 of the hook while the leg 15 passes over the bar and is allowed to snap into closed position by reason of the arched portion 16 formed in the leg.

By reason of the above attaching means for the hook it is not only releasably held in position and thus readily replaceable by another hook but is also held in a position which will prevent contact of the points of the hook with the lure body. Moreover, the hook is caused to stand out from the lure body in a way best suited for the catching of fish. It is desirable of course that the hook should incline slightly to the rear when in use, as indicated in Figure 1, and to provide for such inclination the keel 5 is slightly flattened at the rear side of the slot, as indicated by numeral 17, thus allowing the eye 11 to assume the position shown in Figures 1 and 5.

The rear gang hook 18 may be anchored to the downturned end 6 of the lure by a split ring 19 which extends through a slot 20 formed in this portion of the lure. The position of the hook 12 with respect to the rear hook 18 is such as will provide a proper balance for the complete device.

The lure as above described and as depicted in the drawing is highly efficient in operation. When the lure is drawn through the water the impingement of the downturned end 7 against the water will cause the lure to swing from side to side about the eye 8 as a pivot. The extent of this movement, which might otherwise be a darting movement, is modulated by the keel 5 and by the upturned sides 2 into a wiggle such as is common with live minnows. It should be noted however that the particular transverse shape of the lure body is merely illustrative of one form which the invention may take and that other cross-sectional shapes may be employed to modify the wiggling effect of the lure it being essential only that some longitudinally-extending element be provided which is arranged more or less vertically so as to provide a desired amount of resistance to lateral movement of the lure.

The attaching eye 8 for the line being at the point indicated, which is below the main body of the lure, and the element 7 being inclined slightly to the rear as indicated in Figure 1 it will be apparent that there is a tendency for the lure to rise as it is drawn through the water. This tendency is overcome however by the downturned rear end 6 which acts as a horizontal rudder or vane and the lure therefore travels in a horizontal plane at a constant depth if reeled at a uniform speed.

The hook 12, by reason of its peculiar mounting is maintained in substantially the position shown in Figure 1 when in use and this position is of course highly advantageous in the catching of fish since the hook proper is entirely out of contact with the lure body and is exposed on all sides. Moreover, the particular mounting of the hook prevents contact of the points with the lure body at all times and thus prevents marring of the lure when in use or in storage.

From the foregoing description and the accompanying drawing it will be apparent to those skilled in the art that I have devised a relatively inexpensive lure which may be stamped from sheet metal; that it is strong and durable in operation; that the design is such that a wiggle in close simulation of the action of a minnow is imparted to it as the lure is drawn through the water; that novel means for releasably attaching a hook to the lure body are provided; and that such means not only support the hook in a highly advantageous position for catching fish, but also prevent marring of the lure by eliminating possibility of contact of the hook therewith.

In accordance with the patent statutes I have described one of the preferred forms of the invention, but it is apparent that various modifications may be made without departing from the essentials of the invention and it is intended that all such modifications be included within the scope of the appended claims.

What is claimed is:

1. A fish lure including a body stamped from sheet metal, said body comprising a longitudinally-extending rib or keel on the under-side thereof, and longitudinal side walls.

2. A fish lure including a body formed of sheet material, said body being provided with a rib-like keel extending substantially from end to end thereof, the front end of the body being bent downwardly at substantially a right angle and the rear end of the body curved downwardly.

3. A fish lure including a body formed of sheet material, said body being provided with longitudinally-extending side walls and a longitudinal keel, and both the front and rear ends of said body being bent downwardly.

4. A fish lure including a body formed of sheet material, said body comprising a straight main portion with front and rear ends bent downwardly, a keel formed on said straight portion, and means for securing a fish line to the downturned front end below the plane of the straight portion.

5. A fish lure including a body formed of sheet material, said body comprising a straight main portion with front and rear ends bent downwardly, longitudinally-extending sides on the straight portion, a rib formed on the under-side of the body and extending into the downturned front end, and a line securing eye attached to said front end.

6. A fish lure including a body formed of sheet material, said body being provided with a transverse slot, a bar integral with the body extending above the slot, a fish hook having its eye positioned in the slot, and means for releasably locking the eye to the bar.

7. A fish lure including a body formed of sheet material, said body being provided with a transverse slot, an integral bar extending above the slot, a fish hook having its eye positioned in the slot, and a cotter pin releasably locking the eye to the bar.

8. A fish lure including a body formed of sheet material, a rib-like keel formed on the under-side of the body, said body being provided with a transverse slot, a bar extending above the slot, a fish hook having its eye positioned in the slot, means for locking the hook in position, said rib immediately at the rear of the slot being slightly flattened to permit rearward inclination of the hook.

9. A fish lure including a body formed of sheet material, said body being provided with a transverse slot, a bar extending above the slot, a fish hook having its eye positioned in the slot, and a cotter key having one leg extending through the eye and under the bar, and the other leg extending above the bar.

10. A fish lure including a body formed of sheet material, said body being provided with a transverse slot, a bar extending above the slot, a fish hook having its eye positiond in the slot, and a cotter key having one portion extending under the bar and through the eye and another portion snapped over the bar.

11. A fish lure including a body formed of sheet material, said body being provided with a transverse slot, a bar extending above the slot, a fish hook having its eye positioned in the slot, a cotter key having a pair of legs one of which is straight and the other being provided with an outwardly looped portion, said straight leg extending through the eye and under the bar, and the other leg passing over the bar with the latter positioned in the looped portion.

12. A fish lure including a body formed of sheet material, parallel transverse slits formed in the body and defining a bar pressed upwardly therefrom, a fish hook having its eye positioned in the slot provided by the pressed-up bar, and a cotter key for locking the hook in the slot.

SAM F. DAVENPORT.